United States Patent [19]
Ri

[11] 3,942,025
[45] Mar. 2, 1976

[54] PROCESS FOR STORING ELECTRICITY FOR A FAST ADVANCING CONVEYANCE AND DEVICE FOR STORING SUCH ELECTRICITY

[76] Inventor: Zaisui Ri, 4-4, Takamatsucho, Takarazuka, Japan

[22] Filed: Apr. 22, 1974

[21] Appl. No.: 462,676

[52] U.S. Cl.................................... 290/55; 290/44
[51] Int. Cl.²........................ F03D 9/00; H02P 9/04
[58] Field of Search.............................. 290/44, 55

[56] References Cited
UNITED STATES PATENTS

| | | | |
|---|---|---|---|
| 1,415,645 | 5/1922 | Holterud | 290/55 |
| 2,555,807 | 6/1951 | Morris | 290/55 |
| 2,941,613 | 6/1960 | Perna | 290/44 |
| 3,315,085 | 4/1967 | Mileti et al. | 290/55 X |
| 3,513,326 | 5/1970 | Potts | 290/55 |
| 3,556,239 | 1/1971 | Spahn | 290/55 |
| 3,621,930 | 11/1971 | Dutchak | 290/55 |
| 3,740,565 | 6/1973 | Wesley | 290/55 |

*Primary Examiner*—Robert S. Macon
*Attorney, Agent, or Firm*—Allison C. Collard

[57] ABSTRACT

A device for storing electricity for a fast advancing conveyance wherein a windmill is provided on the conveyance, said windmill being caused to rotate by the wind created by the fast advancing conveyance; a generator is connected directly or indirectly to the rotating shaft of said windmill; and charging and storage device collect and store the electricity generated by the generator.

1 Claim, 2 Drawing Figures

U.S. Patent  March 2, 1976  3,942,025
FIG. 1
FIG. 2
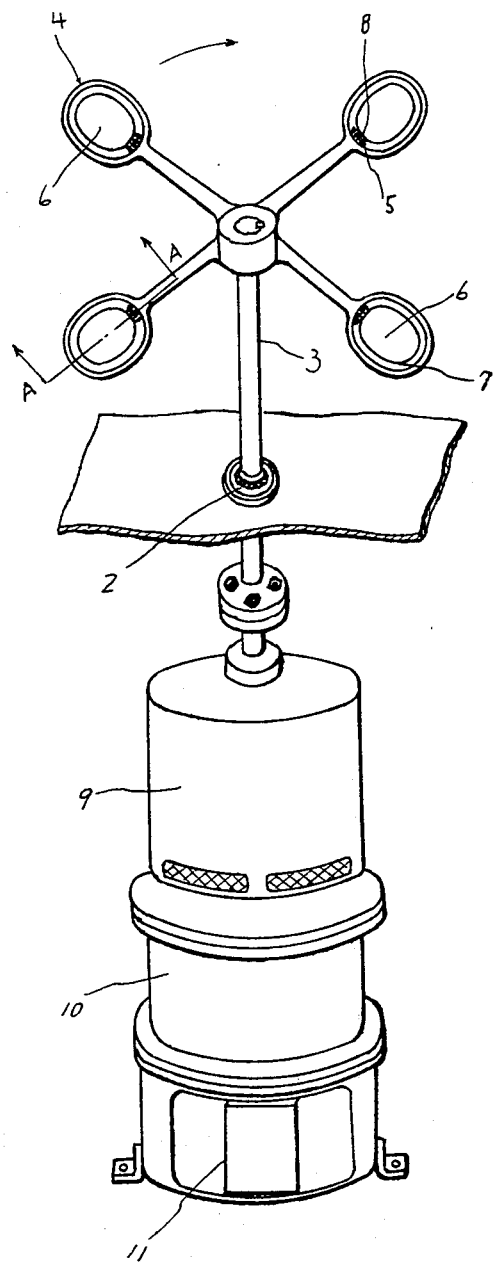
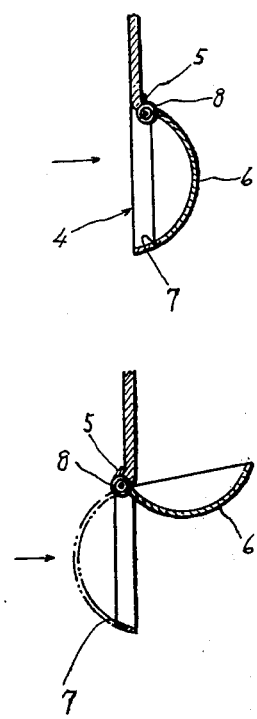

PROCESS FOR STORING ELECTRICITY FOR A FAST ADVANCING CONVEYANCE AND DEVICE FOR STORING SUCH ELECTRICITY

An object of this invention is to make use of a strong wind hitting against a fast advancing conveyance so as to generate and charge electricity, and thereby to store a reserve electricity which may be used for lighting purpose and others. The term conveyance as used herein shall means to include an airplane, an automobile, a ship or the like.

Another object is to provide a device for efficiently generating a large amount of electricity by connecting the device, directly or indirectly, to the rotating shaft of a conveyance.

A still another object is to provide a series of devices to generate, charge and store electricity at all times to supply a large amount of power required temporarily when a conveyance goes up a slope or speeds up or is lighted.

This invention aims to cause a windmill to rotate by utilizing air resistance offered by the advance of a conveyance and thereby to generate and charge electricity by the rotation of the windmill so as to utilize the desired electricity.

For lighting lamps in a conveyance and for supplying power thereto, electricity has hitherto been generated in the case of an automobile by appropriating the rotational power of a rotating shaft which should advance the automobile and in the case of a bicycle by utilizing a friction resistance to wheels which should advance the bicycle. Either of the above methods operates to detract power from the advancing force of the conveyance, and so does not contribute to power economy at all.

On the other hand, this invention utilizes the force of the wind which is naturally created with the power used in the advance of a conveyance so as to rotate a windmill and thereby to utilize the rotation of the windmill so as to generate electricity. In short, a large amount of electricity is generated with a little consumption of force. Thus, by charging the electricity so generated, it is possible to utilize it for lighting lamps and others. Irrespective of the speed of, for example, a bicycle, it is always possible for its lamp to shine with a sufficient brightness. Besides, when a person is going up a slope by bicycle, this invention can furnish him with a motive power to assist him in rotating the wheels of the bicycle as a supplement to his driving force. Thus, this invention has many advantages over the conventional device.

This invention will now be described by way of example with reference to the accompanying drawings in which:

FIG. 1 is a perspective view of the essential parts of apparatus of this invention; and FIG. 2 is a sectional view of a bowl-like wing taken along the AA line.

A conveyance 1 supports a windmill rotating shaft 3 by means of a ball bearing 2. Windmill wings 4 consists of any number of bowl-like wings. The bottom portion 6 of the bowl-like wing will not open when pushed from the inside because of the presence of a bottom plate 7, the wing being pivotally connected by a hinge 8 which contains a spring 5. But when pushed from the outside, the greater part of the bottom portion is allowed to open to form a releasing hole constituting the inner peripheral edge of the bottom plate 7. Thus, when the bowl-like bottom portion 6 faces the wind, it receives the wind to turn around a windmill. But when the wind blows against the back side of the bowl-like wing, the bottom portion 6 is separated by the hinge 8 against the elasticity of the spring 5 to allow the wind blowing in the opposite direction to escape through the releasing hole. In other words, with the apparatus of this invention, such wind does not make any opposite resistance. A generator 9 is connected directly or indirectly to the rotating shaft of said windmill so as to cause electricity to be generated, and a charging device 10 and a storage device 11 are respectively connected to said generator.

As has been described hereinabove, this invention makes use of the wind created by the movement of a conveyance and thereby causes the rotating shaft to rotate in order that a large amount of electrical energy may be generated and stored with a small amount of energy consumption. Thus, the apparatus of this invention has advantages in that it can be used for lighting purposes and as a subsidiary electric power.

While only a single embodiment of the present invention has been shown and described, it will be obvious to those skilled in the art that many changes and modifications may be made thereunto without departing from the spirit and scope of the invention.

What is claimed is:

1. A device for storing electricity for a fast moving conveyance comprising:

a wind mill having a rotating shaft with radially and linearly extending arms, the latter having ends defining substantially circular openings, said shaft being disposed on a fast moving conveyance;

generator means connected to said rotating shafts of said wind mill for causing electricity to be generated;

means for charging and storing the generated electricity, and being connected to said generator means;

said wind mill includes a plurality of substantially bowl-like wings disposed in said circular openings, respectively, and including a bottom plate provided at a bottom edge portion of each of said wings;

a hinge disposed on each of said ends of said arms adjacent a radially innermost portion of said circular openings and pivotally connecting said wings to said arms at a radially innermost portion of said wings, respectively, said wings having a radially outermost free end adjacent a radially outermost portion of said circular openings, said wings being pivotable in an opening direction constituting a direction outwardly relative to the interior of the bowl-like wings and uncovering said circular openings, and said wings closing said circular openings when pushed in a direction towards the inside of said bowl-like wings and abutting said bottom plate, whereby further pivoting in the latter direction is prevented; and a spring disposed on each of said hinges and abutting the corresponding said arm on a linear portion thereof on a side thereof opposite said opening pivoting direction.

* * * * *